US012774779B2

(12) United States Patent
Chiu et al.

(10) Patent No.: US 12,774,779 B2
(45) Date of Patent: Oct. 27, 2026

(54) SUSPENSION BRACKET

(71) Applicant: Wistron NeWeb Corporation, Hsinchu (TW)

(72) Inventors: Yu-Kai Chiu, Hsinchu (TW); Ming-Hung Hung, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 62 days.

(21) Appl. No.: 18/471,440

(22) Filed: Sep. 21, 2023

(65) Prior Publication Data

US 2024/0102609 A1 Mar. 28, 2024

(30) Foreign Application Priority Data

Sep. 28, 2022 (TW) ................................ 111136828

(51) Int. Cl.
*F16M 13/02* (2006.01)

(52) U.S. Cl.
CPC ................................ *F16M 13/027* (2013.01)

(58) Field of Classification Search
CPC .......................... F16M 13/027; F16M 11/041
USPC ......... 248/60, 61, 62, 63, 318, 343, 344, 58, 248/558, 551, 320, 321, 333, 345; 206/806; 411/400, 401
See application file for complete search history.

(56) References Cited

U.S. PATENT DOCUMENTS

| | | | | | |
|---|---|---|---|---|---|
| 766,890 | A * | 8/1904 | Newberg | F16L 3/133 | 248/62 |
| 1,212,126 | A * | 1/1917 | Canfield | F16B 21/12 | 411/925 |
| 1,579,418 | A * | 4/1926 | Tomkinson | F16L 3/11 | 248/62 |
| 2,714,497 | A * | 8/1955 | Denis | F16L 3/11 | 248/62 |
| 2,835,464 | A * | 5/1958 | Kolodin | F16L 3/14 | 248/62 |
| 3,051,424 | A * | 8/1962 | Duhamel | F16L 3/11 | 248/62 |

(Continued)

FOREIGN PATENT DOCUMENTS

| | | | | |
|---|---|---|---|---|
| EP | 2322830 | A1 * | 5/2011 | F16L 3/1025 |
| KR | 19990020426 | U * | 6/1999 | |

(Continued)

*Primary Examiner* — Kimberly T Wood
(74) *Attorney, Agent, or Firm* — McClure, Qualey & Rodack, LLP

(57) ABSTRACT

A suspension bracket and an installing method thereof are provided. The suspension bracket includes a first bracket, a support pole, a positioning member, and a second bracket. The first bracket has an opening and includes a first connecting structure. The support pole is pierced through the opening and configured to be disposed on a preset location, and one end of the support pole abuts against an outer side of the opening. The positioning member is disposed on the support pole and abuts against another outer side of the opening to retain the first bracket. The first bracket is rotatable relative to the positioning member and the support pole. The second bracket includes a second connecting structure, which can be detachably connected to the first connecting structure of the first bracket to form an accommodating space for containing an article.

9 Claims, 13 Drawing Sheets

(56) References Cited

U.S. PATENT DOCUMENTS

| | | | | | |
|---|---|---|---|---|---|
| 3,273,837 | A * | 9/1966 | Willert | F16L 3/11 | 248/62 |
| 3,330,517 | A * | 7/1967 | Zimmermann | F16L 3/2431 | 248/62 |
| 3,565,375 | A * | 2/1971 | Babb | F16L 3/133 | 248/70 |
| 3,866,871 | A * | 2/1975 | Dupuy, Sr. | F16L 3/2235 | 248/68.1 |
| 4,637,175 | A * | 1/1987 | Froening | F16B 37/085 | 52/27 |
| 5,205,692 | A * | 4/1993 | Kelbert | F16B 5/0216 | 411/338 |
| 5,400,993 | A * | 3/1995 | Hamilton | F16M 11/2014 | 248/921 |
| 5,788,440 | A * | 8/1998 | Andronica | F16B 37/125 | 248/58 |
| 6,079,673 | A * | 6/2000 | Cox | F16L 3/1041 | 174/40 R |
| 6,588,713 | B2 * | 7/2003 | Kilkenny | H02G 5/025 | 248/65 |
| 7,077,373 | B1 * | 7/2006 | Hoebener | F16M 11/10 | 248/316.1 |
| 8,047,476 | B2 * | 11/2011 | Van Walraven | F16L 3/1016 | 248/74.1 |
| 8,322,662 | B2 * | 12/2012 | Heath | F16L 3/11 | 248/62 |
| 9,033,290 | B2 * | 5/2015 | Shepard | F16L 3/1025 | 248/65 |
| 10,295,086 | B2 * | 5/2019 | Juzak | F16L 3/11 | |
| 10,502,343 | B2 * | 12/2019 | Juzak | F16L 3/133 | |
| 11,236,778 | B2 * | 2/2022 | Size, Jr. | F16B 37/125 | |
| 2004/0135038 | A1 * | 7/2004 | Barton | F16L 3/14 | 248/59 |
| 2005/0286028 | A1 * | 12/2005 | Challis | G03B 21/22 | 353/119 |
| 2006/0284046 | A1 * | 12/2006 | Umberg | F16M 11/14 | 248/317 |
| 2011/0084178 | A1 * | 4/2011 | Wiedner | F16L 3/11 | 248/62 |
| 2014/0284432 | A1 * | 9/2014 | Shepard | F16L 3/11 | 248/74.2 |
| 2016/0157611 | A1 * | 6/2016 | Wu | F16M 13/027 | 248/289.11 |
| 2019/0017630 | A1 * | 1/2019 | Juzak | F16L 3/1075 | |

FOREIGN PATENT DOCUMENTS

| | | | | |
|---|---|---|---|---|
| KR | 20170124218 | A * | 11/2017 | |
| KR | 102155197 | B1 * | 9/2020 | |
| KR | 20220003287 | A * | 1/2022 | F16L 3/205 |
| TW | M432741 | U | 7/2012 | |

* cited by examiner

SUSPENSION BRACKET

CROSS-REFERENCE TO RELATED PATENT APPLICATION

This application claims the benefit of priority to Taiwan Patent Application No. 111136828, filed on Sep. 28, 2022. The entire content of the above identified application is incorporated herein by reference.

BACKGROUND

Technical Field

The present disclosure relates to a suspension bracket and an installing method of a suspension bracket, and more particularly, to a drop-proof suspension bracket that is easy to disassemble and a method of installing such suspension bracket.

Description of Related Art

Mounting brackets are used to mount equipment on the ceiling or on a planar structure such as the wall. The equipment is installed for specific purpose and often has a heavy load or weight, like speakers, projectors, flat screen televisions, or customer premises equipment (CPE) that supports fixed wireless access network (FWA). However, in order to securely wrap or support the equipment, conventional mounting brackets use multiple screws to fasten several brackets to an installation base, which makes it difficult to detach the equipment from the bracket for maintenance, repair, adjustment, and cleaning. In addition, the mounting bracket requires complex pivoting structure to adjust the angle of the equipment in attempt to face the equipment toward the user, and the angle adjustment is usually limited as well.

On the other hand, with the design of the conventional mounting brackets, when the screws are not tightly fastened, which happens often, and are loosen due to mechanical vibration of the equipment in operation and environmental vibration of the surrounding environment after long period of use, the mounting bracket is at risk for dropping from the ceiling. Also, the equipment is usually attached closely to the ceiling by the conventional mounting brackets and blocked by aluminum sidings, and so the signal transmission of the equipment is affected. Hence, there is a need for a bracket that is free of the aforementioned issues.

SUMMARY

In one aspect, the present disclosure provides a suspension bracket which includes a first bracket, a support pole, a positioning member, and a second bracket. The first bracket has an opening and includes a first connecting structure. The support pole is pierced through the opening and configured to be disposed on a preset location, and one end of the support pole abuts against an outer side of the opening. The positioning member is disposed on the support pole and abuts against another outer side of the opening to retain the first bracket. The first bracket can be rotated relative to the positioning member and the support pole. The second bracket includes a second connecting structure detachably connected to the first connecting structure of the first bracket to form an accommodating space for containing an article.

In another aspect, the present disclosure provides a method of installing a suspension bracket, and the method includes a support pole piercing step, a positioning member placing step, a support pole placing step, an article placing step, and a bracket connecting step. The support pole piercing step is to pass a support pole through an opening of a first bracket such that one end of the support pole abuts against an outer side of the opening, and the first bracket includes a first connecting structure. The positioning member placing step is to dispose a positioning member on the support pole such that the positioning member abuts against another outer side of the opening to retain the first bracket. The support pole placing step is to install the support pole at a preset location. The article placing step is to place an article in a second bracket, and the second bracket includes a second connecting structure. The bracket connecting step is to detachably connect the second connecting structure and the first connecting structure to form an accommodating space for containing the article.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
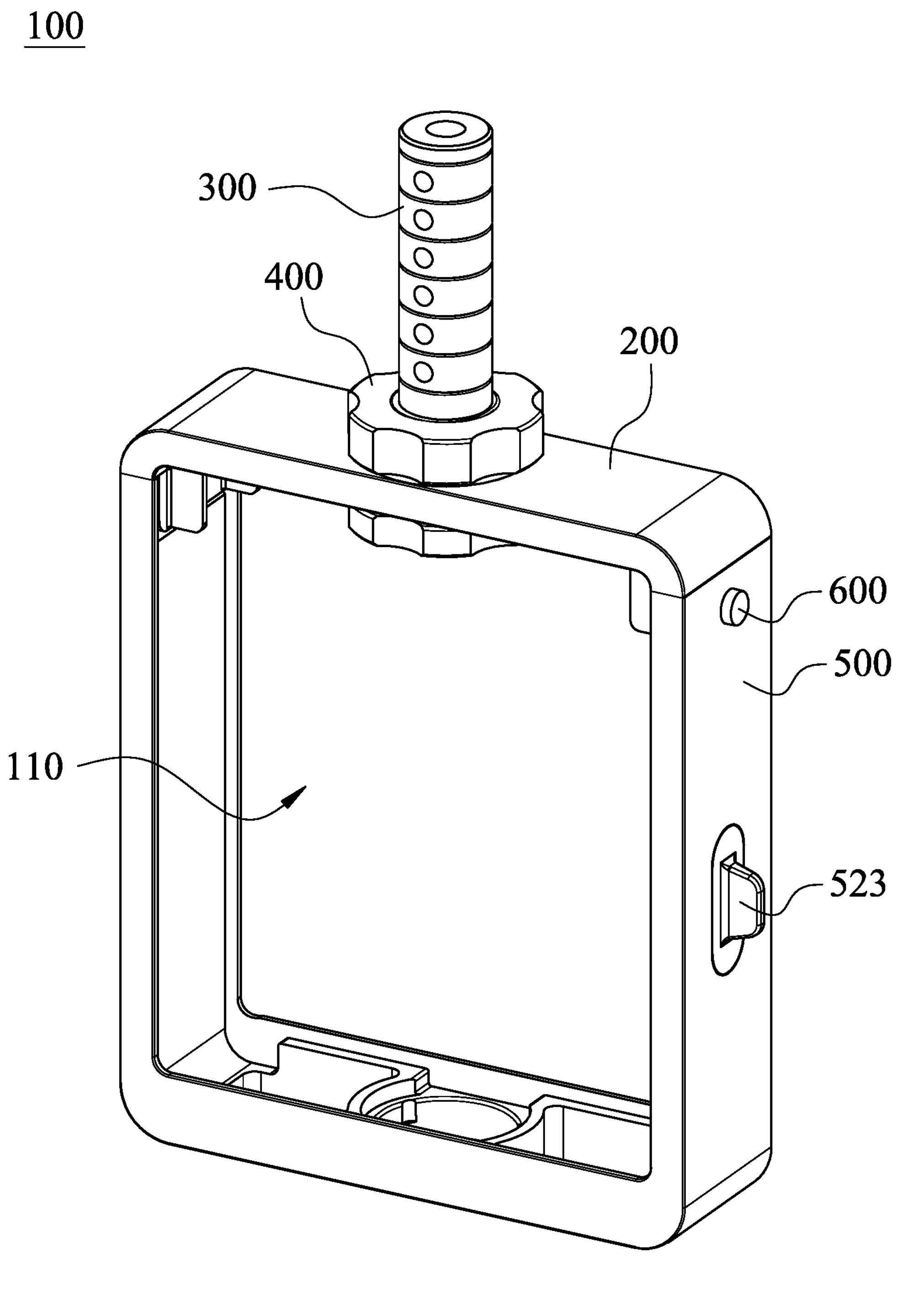
FIG. 1 is a schematic view of a suspension bracket according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
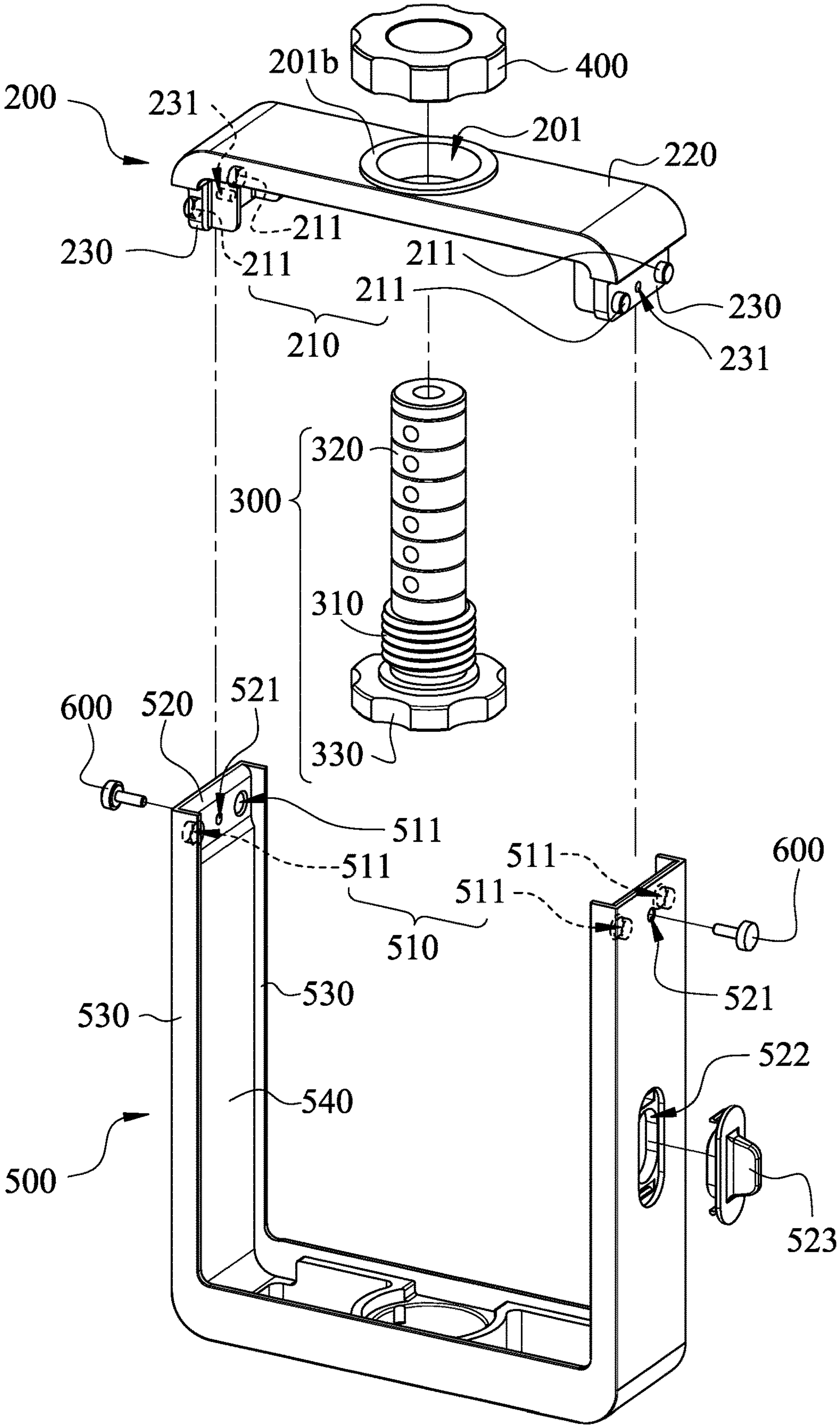
FIG. 2 is an exploded view of the suspension bracket in FIG. 1.
Figure 3:
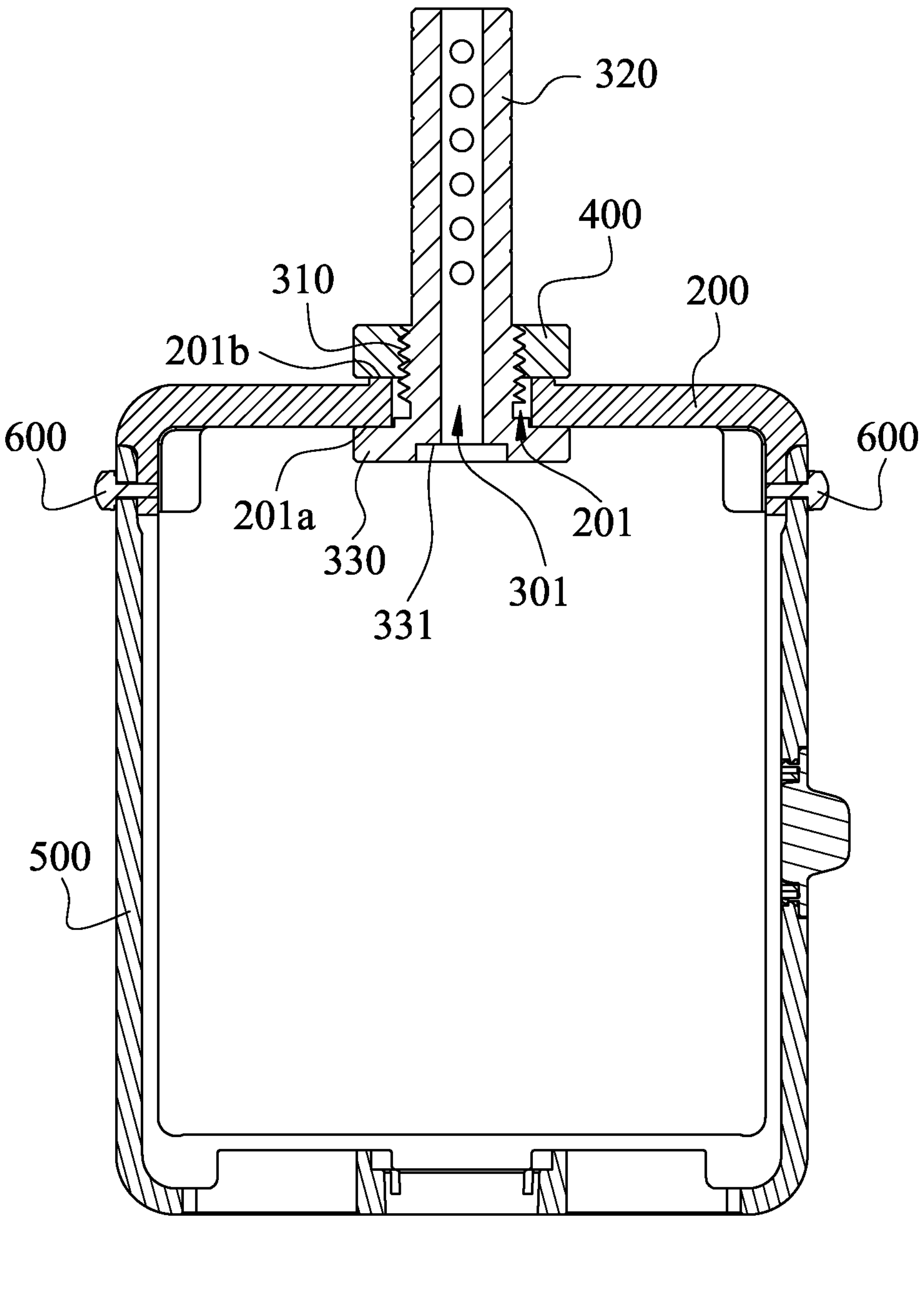
FIG. 3 is a cross-sectional view of the suspension bracket in FIG. 1.
Figure 4:
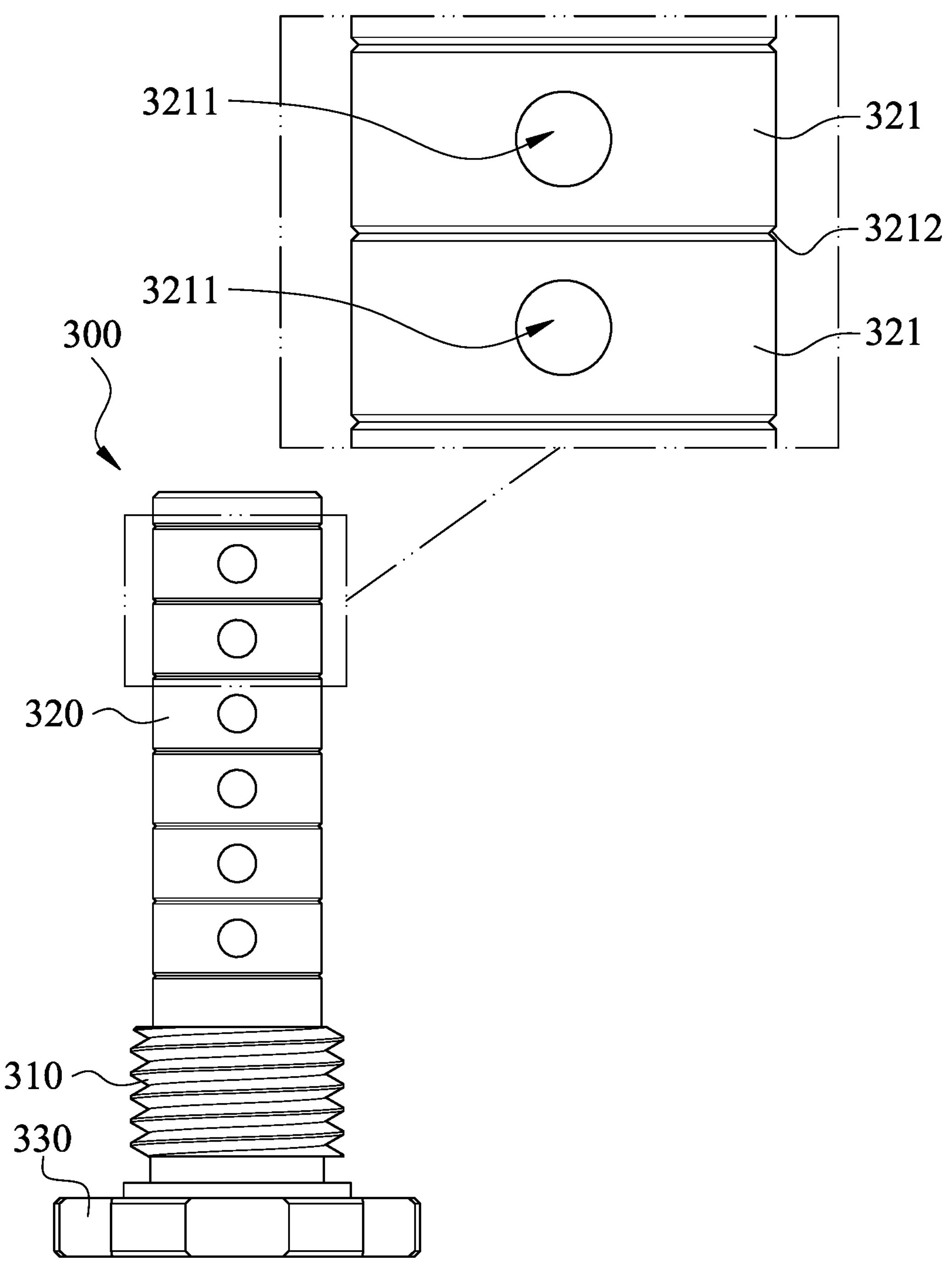
FIG. 4 is a front view of a support pole of the suspension bracket in FIG. 1.

Referring to FIG. 1 and FIG. 2, a suspension bracket 100 according to a first embodiment includes a first bracket 200, a support pole 300, a positioning member 400, and a second bracket 500. The first bracket 200 has an opening 201 and includes a first connecting structure 210. The support pole 300 is pierced through the opening 201 and configured to be placed or installed at a preset location 120 (shown in FIG. 10), and one end of the support pole 300 abuts against an outer side 201*a* (shown in FIG. 3) of the opening 201. The positioning member 400 is disposed on the support pole 300 and abuts against another outer side 201*b* of the opening 201 to retain and support the first bracket 200. The first bracket 200 can be rotated relative to the positioning member 400 and the support pole 300. The second bracket 500 includes a second connecting structure 510 that is detachably connected to the first connecting structure 210 so as to form an accommodating space 110 for containing an article (not shown) therein. Thus, with the suspension bracket 100 of the present disclosure, the article can be taken out or placed in by simply detaching (i.e., disassembling) or attaching (i.e., assembling) the second connecting structure 510 of the second bracket 500 from or to the first connecting structure 210 of the first bracket 200, and so the user can easily obtain or setup the article. Moreover, the positioning member 400 can be a hand-rotatable nut or a knob nut, so the user just needs to loosen the positioning member 400 to freely adjust the assembling angle of the first bracket 200. And even if the positioning member 400 on the support member 300 was not completely tightened to the another outer side 201*b* of the opening 201 due to human error, the first bracket 200 is still held by the support pole 300 and would not drop from the top.

In specific, the first connecting structure 210 includes at least two first coupling sections 211. The number of first coupling sections 211 shown in FIG. 2 is four, and the four first coupling sections 211 are respectively located at two sides of the first bracket 200. In other words, two of the first coupling sections 211 are positioned at one side of the first bracket 200, and the other two of the first coupling sections 211 are positioned at the other side of the first bracket 200. The second connecting structure 510 includes at least two second coupling structure 511. In FIG. 2, the number of second coupling sections 511 is equal to the number of first coupling sections 211, which is four, and the four second coupling sections 511 are detachably connected to the four first coupling sections 211 and respectively positioned at two sides of the second bracket 500. In other words, two of the second coupling sections 511 are disposed at one side of the second bracket 500, and the other two of the second coupling sections 511 are disposed at the other side of the second bracket 500.

Moreover, the first bracket 200 further includes a support section 220 and two connecting sections 230. The support section 220 is a rectangular plate body, and the opening 201 is positioned at the support section 220. The two connecting sections 230 are respectively connected to two ends of the support section 220, and the four first coupling sections 211 of the first connecting structure 210 are respectively disposed on the two connecting sections 230. The second bracket 500 further includes a frame body 520 and two side walls 530. The frame body 520 has a U-shape, and the four second coupling sections 511 of the second connecting structure 510 are positioned at two ends of the frame body 520. The two side walls 530 are respectively connected to two sides of the frame body 520 to form an accommodating slot 540, and the accommodating slot 540 is configured to receive and contain the article in place before connecting the second connecting structure 510 to the first connecting structure 210. Therefore, the suspension bracket 100 of the present disclosure can prevent the article from falling out of the accommodating space 110 by retaining the article with the two side walls 530.

The first bracket 200 further includes two first fastening holes 231 respectively disposed on the two connecting sections 230, and each first fastening hole 231 is positioned between two first coupling sections 211. The second bracket 500 further includes two second fastening holes 521 and a through hole 522. The two second fastening holes 521 are respectively positioned at two ends of the frame body 520, and each second fastening hole 521 corresponds in position with each first fastening hole 231 and is disposed between two second coupling sections 511. The through hole 522 is disposed at one side surface of the frame body 520 and configured for a side cover 523 to be detachably connected. The suspension bracket 100 further includes two fastening screws 600 that are fastened through the first fastening hole 231 and the second fastening hole 521. In particular, each fastening screw 600 is a hand-turnable screw that can be screwed to the first fastening hole 231 and the second fastening hole 521 so as to fasten the first bracket 200 and the second bracket 500 together. It is to be noted that with the advancement in communication technology, many sports events, professional games, and entertainment venues are equipped with CPE that supports FWA, and if CPE is the article to be placed in the suspension bracket 100, by taking off the side cover 523 and exposing the through hole 522, the user can directly press the button on the CPE to adjust and switch operation modes. The material of the side cover 523 is the same as the material of the second bracket 500, so that the radio frequency signal transmission of the antenna module in the CPE won't be affected due to the configuration of the through hole 522.

Referring to FIG. 1 to FIG. 4, the support pole 300 includes a threaded section 310, an extended section 320, and a knob section 330. The threaded section 310 is configured to be fastened with the positioning member 400. The extended section 320 is connected to one end of the threaded section 310. The knob section 330 is connected to another end of the threaded section 310 and abuts against the outer side 201*a* of the opening 201, and the outer side 201*a* is, for example, a surface of the support section 220 of the first bracket 200. In addition, the support pole 300 has a through hole 301 that penetrates the threaded section 310, the extended section 320, and the knob section 330, and the through hole 301 is configured for a fastener 340 (shown in FIG. 10) to pierce through. When the fastener 340 is pierced through the through hole 301, one end of the fastener 340 adjacent to the extended section 320 is used for the installation purpose at the preset location 120. The knob section 330 has a round notch 331 and is abutted by the fastener 340, and the other end of the fastener 340 is fitted in the round notch 331. Thus, the weight of the suspension bracket 100 and the article is supported through the fastener 340 abutting the round notch 331, and the support pole 300 is suspended from the preset location 120 through the fastener 340. The preset location 120 is a ceiling or a planar structure like a wall surface, and the fastener 340 is a nail screw, a screw, or a rivet, but the present disclosure is not limited thereby.

The extended section 320 includes a plurality of extension parts 321 that are sequentially connected. Each extension part 321 has a locking hole 3211. The extended section 320 can be inserted directly into the tube of a commercial ceiling TV rack and fixedly connect the support pole 300 to the ceiling TV rack by at least one locking pin passing through the at least one locking hole 3211. Further, there is a groove 3212 between every two adjacent extension parts 321. The groove 3212 is a V-cut groove, and the groove depth and the groove width of the groove 3212 are respectively 1 mm and 0.6 mm, but the present disclosure is not limited thereto. The suspension bracket 100 of the present disclosure is able to adjust the length of the extended section 320 according to the desired suspension height of the article or the length of the fastener 340 by cutting the groove 3212 with a cutting tool.

Figure 5:
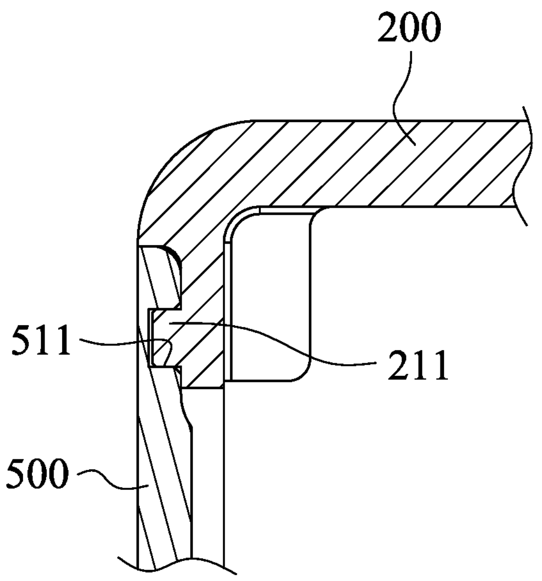
FIG. 5 is a partial cross-sectional view of the suspension bracket in FIG. 1.
Figure 6:
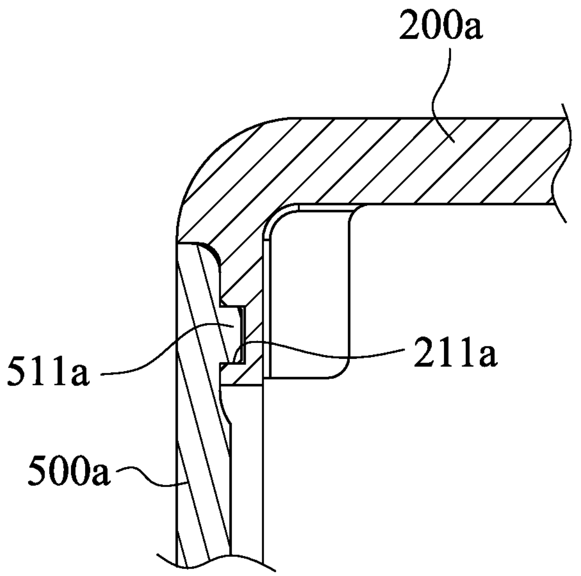
FIG. 6 is a partial cross-sectional view of a suspension bracket according to a second embodiment of the present disclosure.

Referring to FIG. 5 and FIG. 6, one of the connected first coupling section and second coupling section is a protrusion, and the other one of the connected first coupling section and second coupling section is a recess. As shown in FIG. 5, each first coupling section 211 of the first bracket 200 is a protrusion, and each second coupling section 511 of the second bracket 500 connected thereto is a recess. As shown in FIG. 6, each first coupling section 211*a* of the first bracket 200*a* is a recess, and each second coupling section 511*a* of the second bracket 500*a* connected thereto is a protrusion. In FIG. 5 and FIG. 6, the protrusion is a circular column, and the recess is a circular recess, but the present disclosure is not limited thereto. In other embodiments, the two first coupling sections on the same side of the first bracket can respectively be a protrusion and a recess, and the two second coupling sections on the same side of the second bracket can respectively be a protrusion and a recess. Furthermore, the protrusion can be a rectangular column, a triangular column, or a protrusion with a single cross-section, and the recess connected to the protrusion can also be a rectangular recess, a triangular recess, or a recess with a single cross-section.

Figure 7:
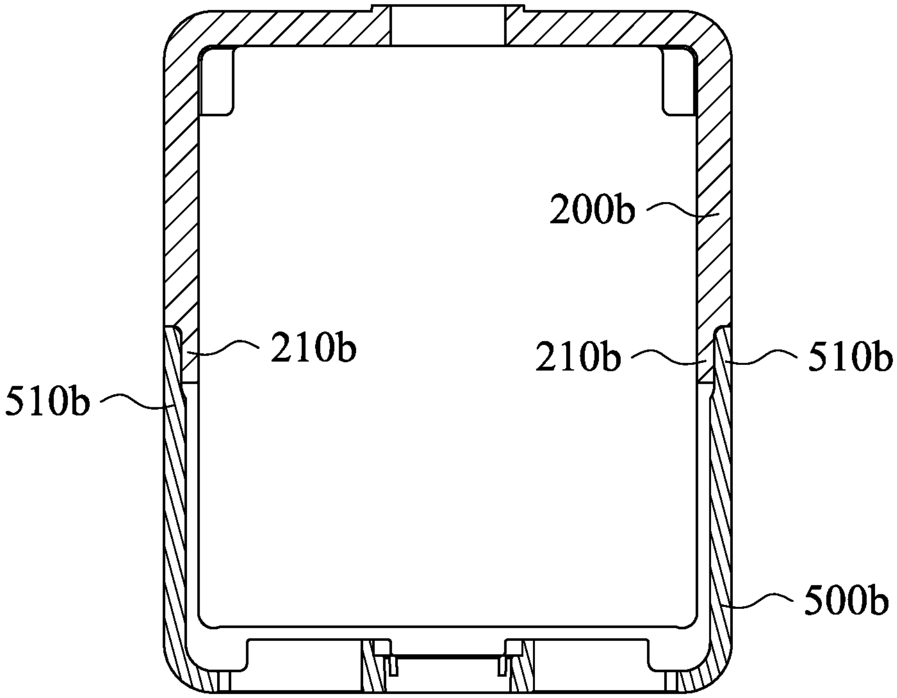
FIG. 7 is a cross-sectional view illustrating a first bracket and a second bracket of a suspension bracket connected together according to a third embodiment of the present disclosure.
Figure 8:
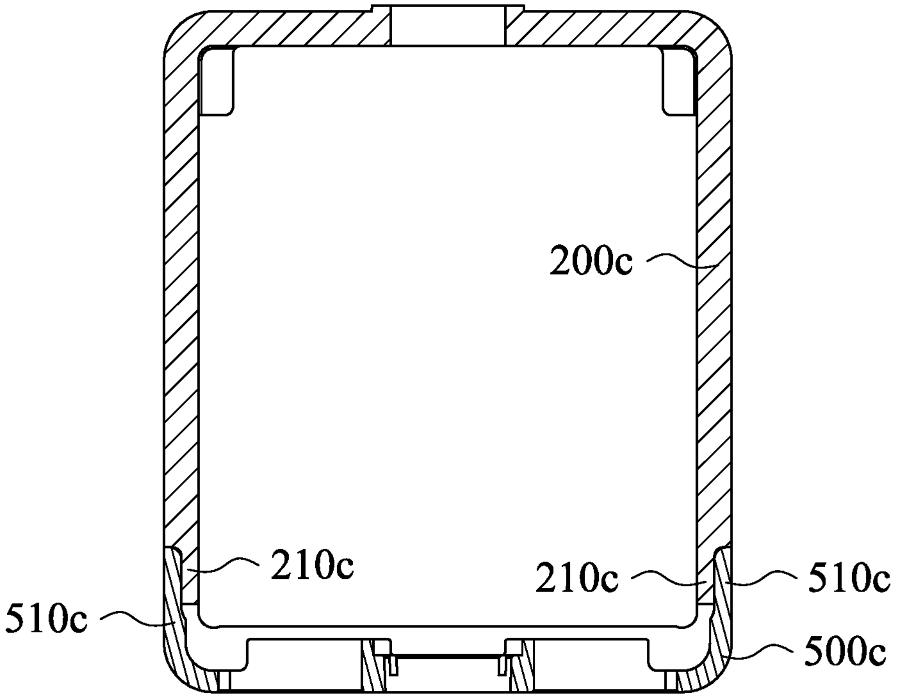
FIG. 8 is a cross-section view illustrating a first bracket and a second bracket of a suspension bracket connected together according to a fourth embodiment of the present disclosure.
Figure 9:
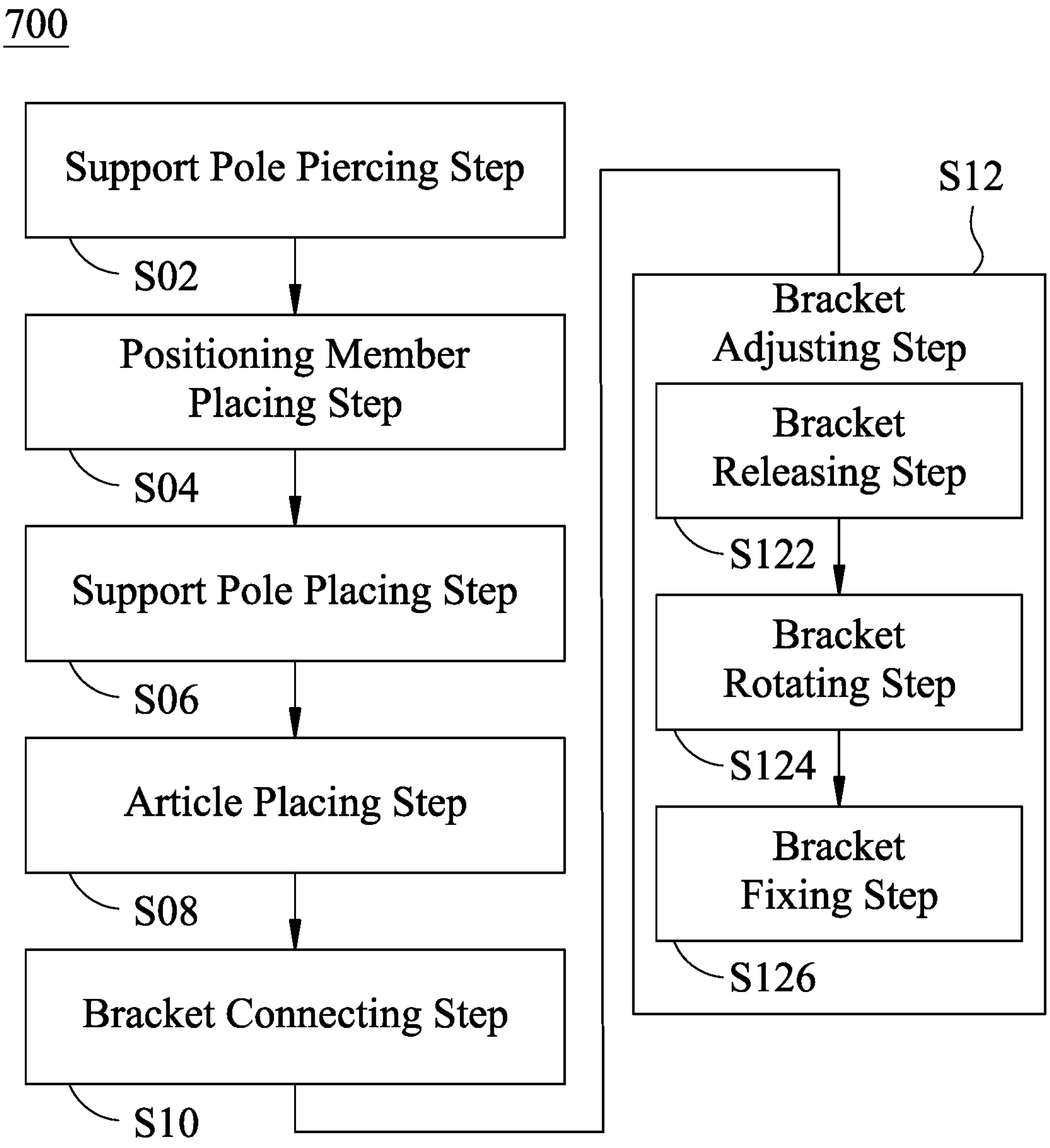
FIG. 9 is a flow chart of a method of installing a suspension bracket according to a fifth embodiment of the present disclosure.

Referring to FIG. 7, a first bracket 200*b* and a second bracket 500*b* according to a third embodiment are both U-shaped. The two first connecting structures 210*b* are positioned at two ends of the first bracket 200*b*. The two second connecting structures 510*b* are positioned at two ends of the second bracket 500*b*. The first connecting structure 210*b* and the second connecting structure 510*b* are connected at approximately the middle of the overall suspension bracket. Referring to FIG. 8, a first bracket 200*c* and a second bracket 500*c* according to a fourth embodiment respectively have a U-shape frame and a U-shape or rectangular-shape frame. The two first connecting structures 210*c* are positioned at two ends of the first bracket 200*c*. The two second connecting structures 510*c* are positioned at two ends of the second bracket 500*c*. The first connecting structure 210*c* and the second connecting structure 510*c* are connected at the lower half of the suspension bracket. The present disclosure does not limit the location at where the first connecting structure and the second structure are connected.

Referring to FIG. 1 to FIG. 3 and FIG. 9 to FIG. 13, a method 700 of installing the suspension bracket 100 (hereinafter referred to as the installing method 700) includes a support pole piercing step S02, a positioning member placing step S04, a support pole placing step S06, an article placing step S08, and a bracket connecting step S10.

Figure 10:
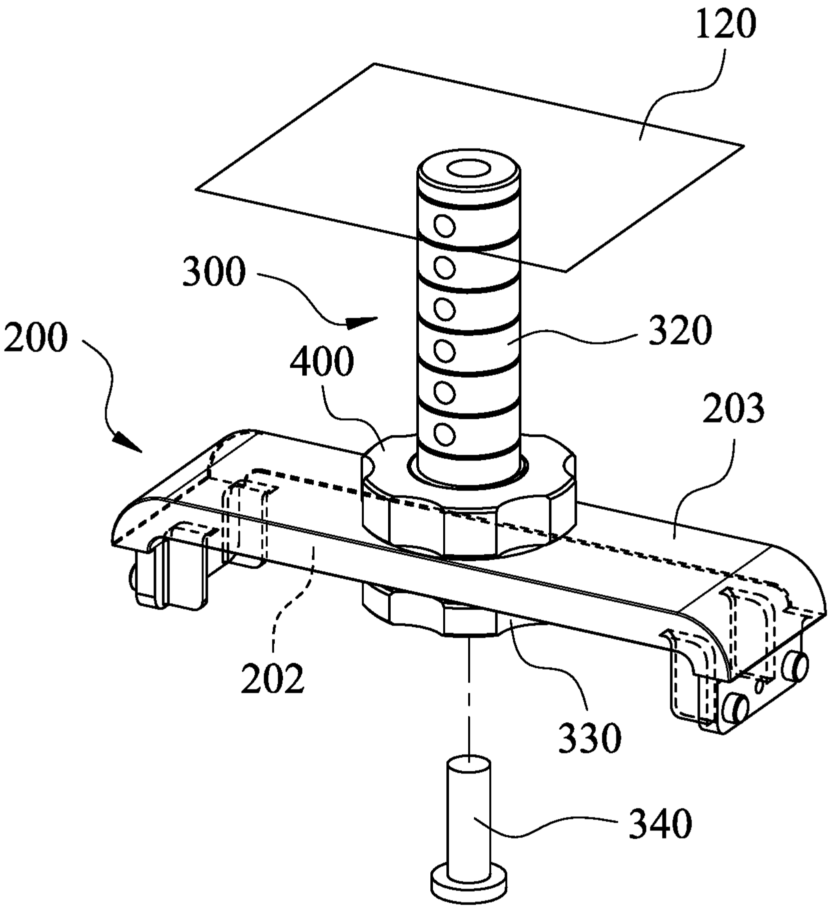
FIG. 10 is a schematic diagram illustrating a support pole piercing step, a positioning member placing step, and a support pole placing step of the method in FIG. 9 being performed.

As shown in FIG. 10, the support pole piercing step S02 is to pass or pierce the support pole 300 through the opening 201 of the first bracket 200, so that one end of the support pole 300 abuts against the outer side 201*a* of the opening 201, and the outer side 201*a* is a surface 202 of the first bracket 200. The positioning member placing step S04 is to dispose the positioning member 400 on the support pole 300, such that the positioning member 400 abuts against the another outer side 201*b* of the opening 201 to retain the position of the first bracket 200, and the another outer side 201*b* is the other surface 203 of the first bracket 200. The support pole placing step S06 is to install the support pole 300 at the preset location 120. In the support pole placing step S06, the fastener 340 is pierced through the through hole 301 of the support pole 300, and one end of the fastener 340 is mounted to the preset location 120. As such, the other end of the fastener 340 is fitted in the round notch 331 of the knob section 330, so that the fastener 340 supports the support pole 300 and in turn the support pole 300 supports the first bracket 200.

Figure 11A:
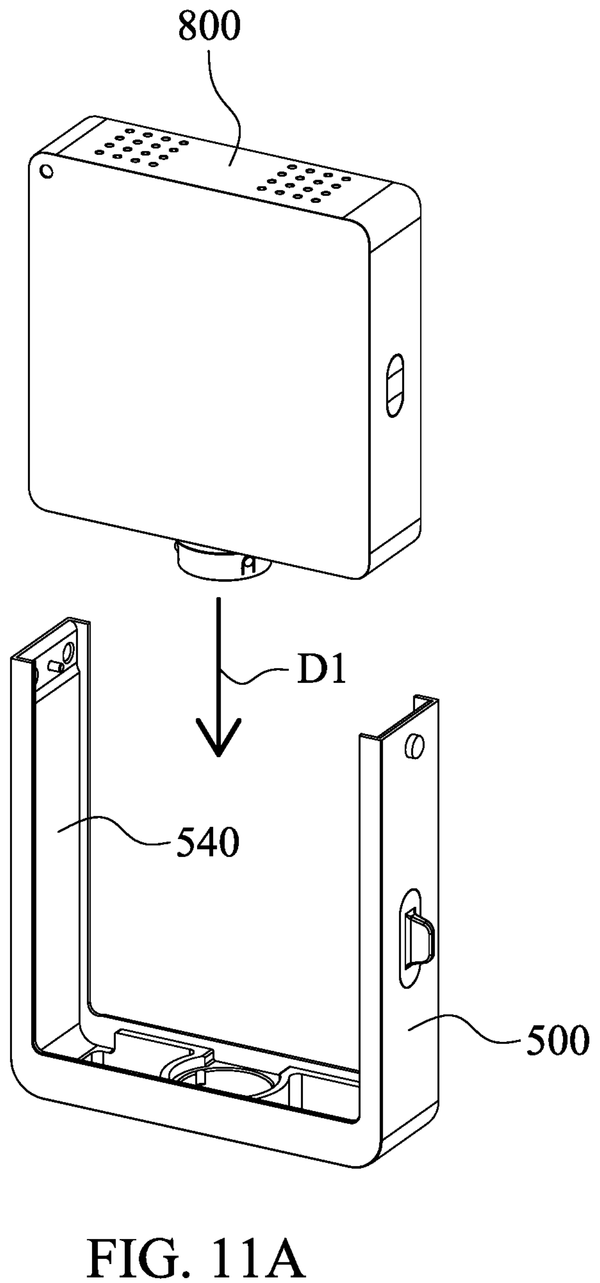
FIG. 11A is a schematic diagram illustrating an article placing step of the method in FIG. 9 being performed.
Figure 11B:
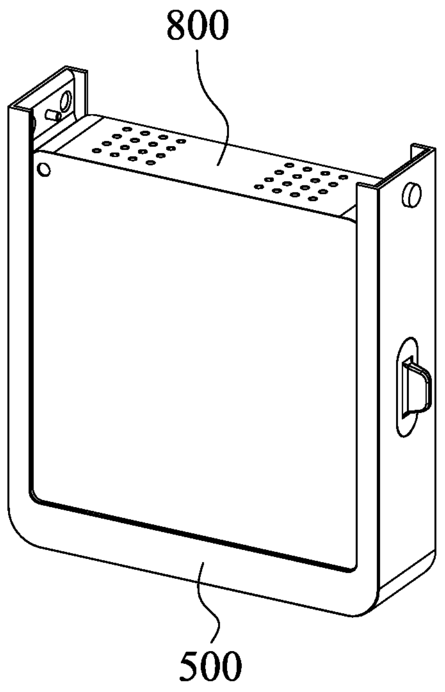
FIG. 11B is another schematic diagram illustrating an article placing step of the method in FIG. 9 being performed.
Figure 12A:
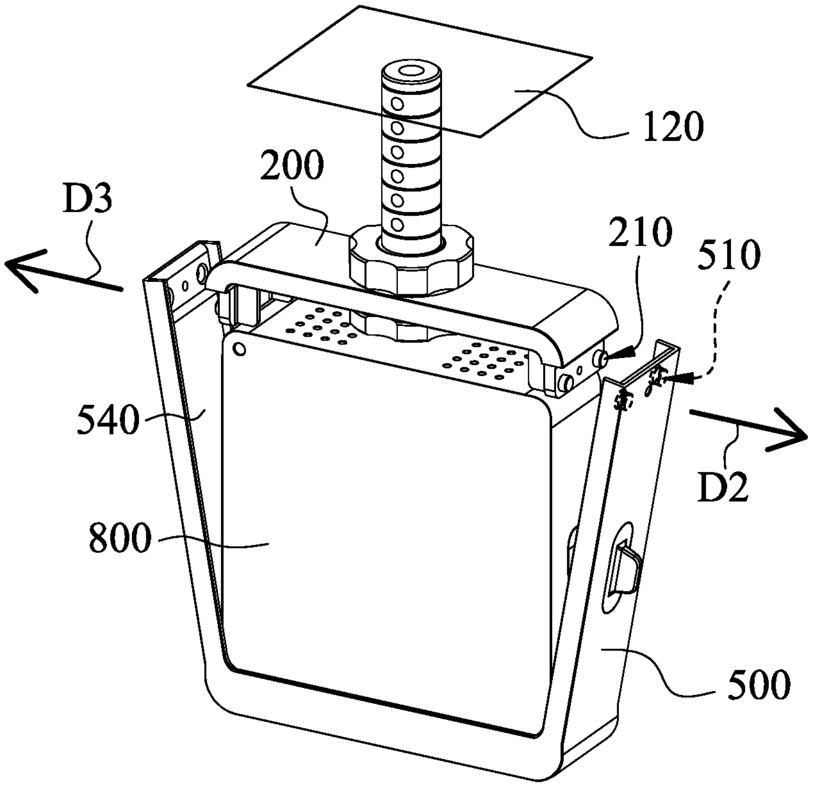
FIG. 12A is a schematic diagram illustrating a bracket connecting step of the method in FIG. 9 being performed.
Figure 12B:
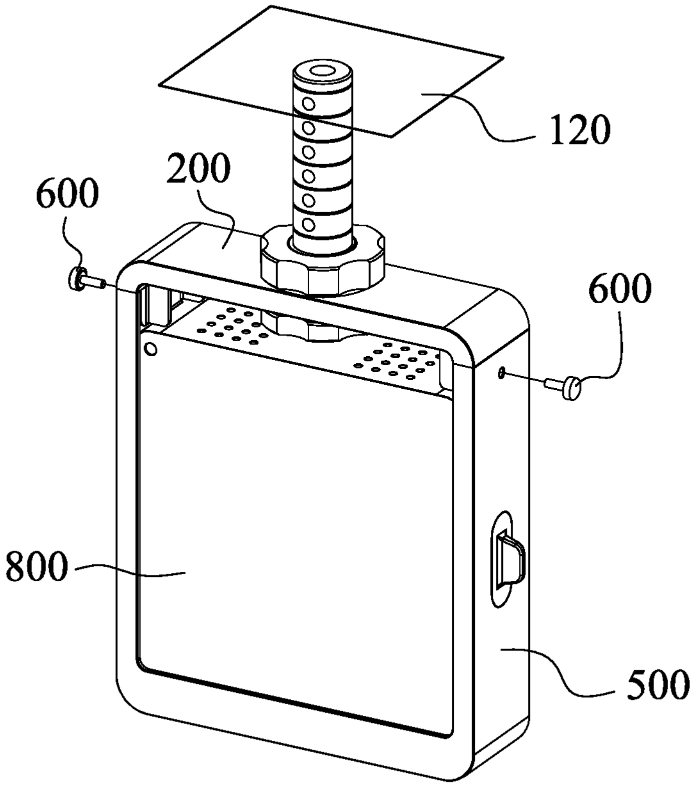
FIG. 12B is another schematic diagram illustrating a bracket connecting step of the method in FIG. 9 being performed.

Referring to FIG. 11A and FIG. 11B, the article placing step S08 is to place an article 800 along a direction D1 into the accommodating slot 540 of the second bracket 500, so that the article 800 is received by the second bracket 500. As shown in FIG. 12A, the bracket connecting step S10 includes detachably connecting the second connecting structure 510 of the second bracket 500 to the first connecting structure 210 of the first bracket 200 to form the accommodating space 110 for containing the article 800 therein. In specific, at least one of the first bracket 200 and the second bracket 500 is made of elastic material. In the bracket connecting step S10, the two ends of the second bracket 500 are respectively pushed outwardly toward two directions D2, D3 to engage the second connecting structure 510 with the first connecting structure 210. More particularly, when the article 800 is placed in the accommodating slot 540, the four second coupling sections 511 of the second connecting structure 510 are aligned in position with and assembled to the four first coupling sections 211 of the first connecting structure 210, so that the second bracket 500 together with the article 800 are assembled to the first bracket 200. As shown in FIG. 12B, the bracket connecting step S10 further includes fastening the fastening screw 600 to the first fastening hole 231 of the first bracket 200 and the second fastening hole 521 of the second bracket 500, such that the first bracket 200 and the second bracket 500 are fastened together to prevent the second bracket from disengaging from the first bracket 200 due to impact or vibration. Thus, the installing method 700 of the present disclosure only requires a person to detach or assemble the second connecting structure 510 of the second bracket 500 from or to the first connecting structure 210 of the first bracket 200 to unload or install the article 800, and so the user can easily obtain or setup the article 800. Furthermore, since the first bracket 200 and the second bracket 500 are assembled by their respective first connecting structure 210 and second connecting structure 510, even if the fastening screw 600 became loose, the second bracket 500 and the article 800 carried thereby would not drop or fall easily.

Figure 13:
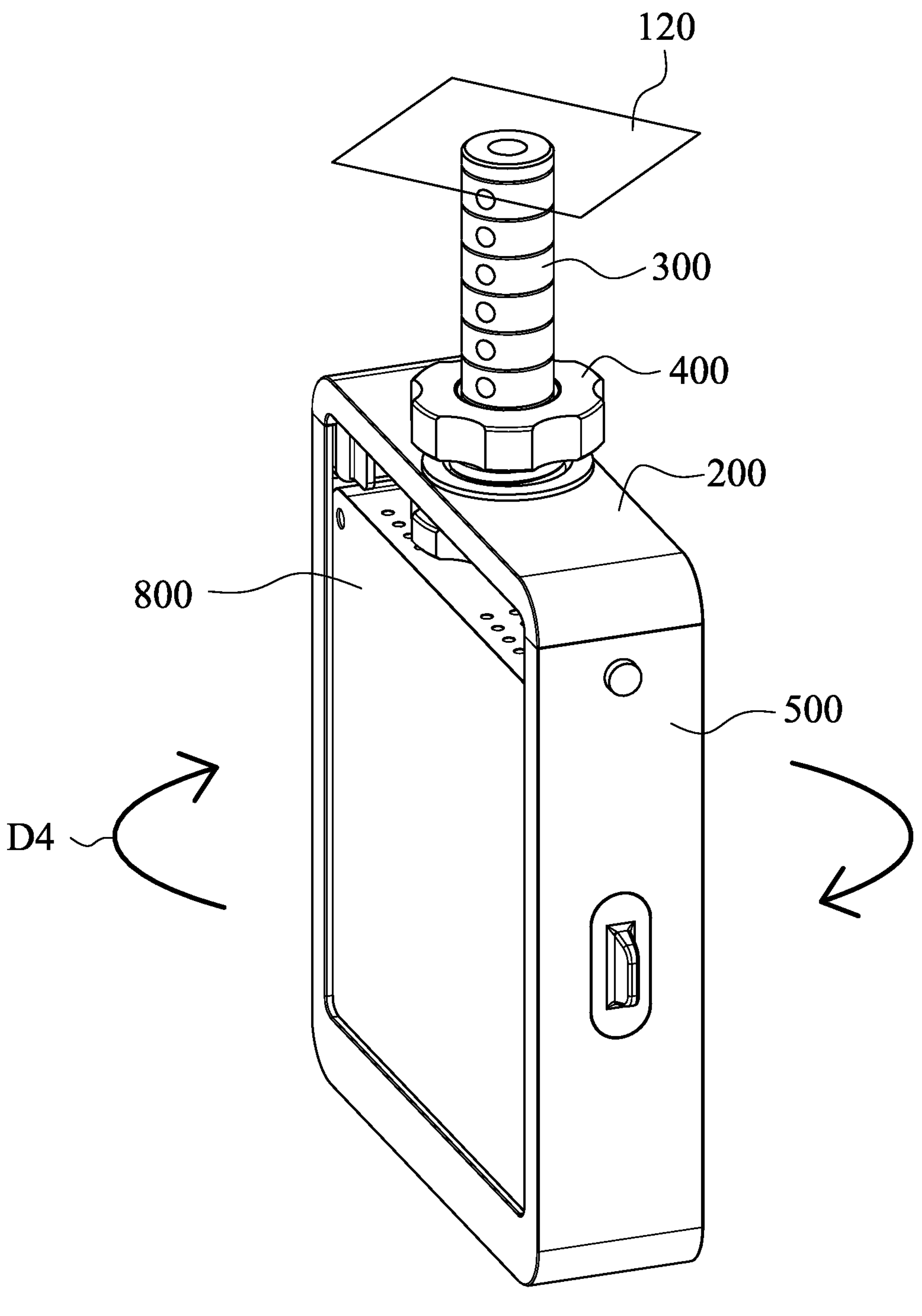
FIG. 13 is a schematic diagram illustrating a bracket adjusting step of the method in FIG. 9 being performed.

As shown in FIG. 13, the installing method 700 further includes a bracket adjusting step S12. The bracket adjusting step S12 includes a bracket releasing step S122, a bracket rotating step S124, and a bracket fixing step S126. The bracket releasing step S122 is to rotate the positioning member 400 relative to the support pole 300 to move the positioning member 400 away from the first bracket 200 so as to release or loosen the first bracket 200. The bracket rotating step S124 is to rotate the first bracket 200 in a direction D4 or in a reverse direction of the direction D4 to adjust the assembling angle of the first bracket 200 to put the article 800 facing a particular direction. The bracket fixing step S126 is to rotate the positioning member 400 relative to the support pole 300, so that the positioning member 400 moves toward and closes in on the first bracket 200 to tighten and fix or fasten the first bracket 200. Thus, the user only needs to release the positioning member 400 and then rotate the first bracket 200 to adjust the assembling angle of the first bracket 200, which is also the assembling angle of the article 800. Even if the positioning member 400 on the support pole 300 was not threaded tightly to the first bracket 200 due to human error, the first bracket 200 is still supported by the support pole 300 and would not drop directly, and as such the second bracket 500 that carries the article 800 also would not drop.

In view of the above, the suspension bracket and the installing method of the present disclosure embody the following advantages: first, the suspension bracket can be installed by bare hand and is easy to detach, and even if the positioning member is loose or not screwed tightly, the first bracket and the second bracket that carry the article will not fall off freely; second, the assembling angle of the first bracket can be adjusted directly and freely by simply loosen the positioning member instead of taking down the entire suspension bracket; and third, the suspension bracket can be attached to the ceiling or the wall, and can also be attached to the ceiling TV rack sold on the market, and through cutting the groove of the support pole, the installation height of the suspension bracket can be adjusted.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A suspension bracket comprising:
- a first bracket having an opening and comprising a first connecting structure;
- a support pole pierced through the opening and configured to be disposed on a preset location, wherein one end of the support pole abuts against an outer side of the opening;
- a positioning member disposed on the support pole, wherein the positioning member abuts against another outer side of the opening to retain the first bracket, and the first bracket can be rotated relative to the positioning member and the support pole; and
- a second bracket comprising a second connecting structure, wherein the second connecting structure is detachably connected to the first connecting structure of the first bracket to form an accommodating space for containing an article;
- wherein the support pole comprises:
  - a threaded section for fastening the positioning member;
  - an extended section connected to one end of the threaded section; and
  - a knob section connected to another end of the threaded section, wherein the knob section abuts against the outer side of the opening;
- wherein the second bracket further comprises:
  - a frame body, wherein the second connecting structure is positioned at the frame body; and
  - two side walls respectively connected to two sides of the frame body to form an accommodating slot for receiving the article.

2. The suspension bracket according to claim 1, wherein,
- the first connecting structure comprises at least two first coupling sections respectively positioned at at least two sides of the first bracket; and
- the second connecting structure comprises at least two second coupling sections respectively positioned at at least two sides of the second bracket and detachably connected to the at least two first coupling sections.

3. The suspension bracket according to claim 2, wherein one of the at least two first coupling sections and the at least two second coupling sections that are respectively connected is a protrusion, and another one of the at least two first coupling sections and the at least two second coupling sections that are respectively connected is a recess.

4. The suspension bracket according to claim 3, wherein each protrusion is a circular column, a rectangular column, or a triangular column, and each recess is a circular recess, a rectangular recess, or a triangular recess.

5. The suspension bracket according to claim 2, wherein the first bracket further comprises:
- a support section, wherein the opening is positioned at the support section; and
- two connecting sections respectively connected to two ends of the support section, wherein the at least two first coupling sections are respectively disposed on the two connecting sections.

6. The suspension bracket according to claim 1, wherein at least one of the first bracket and the second bracket have a U-shape.

7. The suspension bracket according to claim 1, wherein,
- the support pole comprises a through hole, wherein the through hole penetrates the threaded section, the extended section, and the knob section and is configured to be pierced through by a fastener, and the fastener is configured to be disposed on the preset location; and the knob section comprises a round notch, wherein the fastener abuts against the round notch to place the support pole at the preset location.

8. The suspension bracket according to claim 1, wherein the extended section comprises a plurality of extension parts sequentially connected, each of the plurality of extension parts has a locking hole, and there is a groove between every two adjacent extension parts.

9. The suspension bracket according to claim 1, wherein the first bracket further comprises a first fastening hole, the second bracket further comprises a second fastening hole, and the suspension bracket further comprises a fastening screw fastened through the first fastening hole and the second fastening hole.

* * * * *